June 24, 1958 — A. T. LE BEAU — 2,840,414

COMBINATION CULTIVATING SHOVEL AND FORK

Filed Feb. 28, 1956

*INVENTOR.*
ALFRED T. LE BEAU
BY R. W. Hodgson

United States Patent Office

2,840,414
Patented June 24, 1958

2,840,414

COMBINATION CULTIVATING SHOVEL AND FORK

Alfred T. LeBeau, Oakland, Calif., assignor of one-tenth to Gadget-Of-The-Month Club, Inc., Los Angeles, Calif., a corporation of California Application February 28, 1956, Serial No. 568,363

4 Claims. (Cl. 294—51)

This invention relates to ground cultivating implements of the type generally referred to as garden tools, and more particularly to an improved tool combining the structural features and the functional utility of a cultivating fork and a spade or shovel.

During most hand cultivating in flower beds and vegetable gardens, it is frequently found necessary to move small quantities of earth from one point to another in order to level the ground surface or to form basins and channels for irrigation and drainage purposes. This makes it necessary for the gardener to keep near at hand both a fork to loosen the earth and a spade or shovel with which to move it.

Similarly, when transplanting bulbs and plants, a fork and shovel are needed to dig the hole at the new location, then a fork is needed to loosen the soil around the plant and, finally, a shovel is again needed for lifting the plant from the ground, carrying it to the new location, filling earth into the open spaces around the plant and filling up the hole at the original location.

These instances are typical of innumerable digging and cultivating situations in which the penetrating, prying and pulverizing functions of a fork and the flat supporting surface of a shovel are alternately required.

The present invention was made with the foregoing considerations in mind and has a number of important objects, some of which are enumerated below.

In brief, the device of my invention includes a substantially conventional cultivating fork having a plurality of flat prongs extending from a yoke member, the yoke being terminated opposite from the prongs in a handle receiving socket. Hinged to the yoke portion perpendicularly to the prongs and the handle is a movable member (usually a planar member) dimensioned to extend beyond the ends of the prongs having slots disposed therein at right angles to the hinge line adapted to receive the prongs, and having slots parallel to the hinge line to engage the tips of the prongs and hold the planar member and the prongs in substantial alignment (usually in substantially the same plane). Coil springs disposed along the hinge line are biased so as to swing the planar member upwardly when its slots are disengaged from the tips of the prongs, thus leaving the prongs free and clear when the device is used as a conventional fork. Disengagement and re-engagement of the prong tips in the slots of the planar member is accomplished instantaneously at the will of the gardener by pressing his toe against a positioning arm adjacent the hinge line.

One important object of this invention is the provision of a garden implement adapted both for cultivating and for earth moving operations.

Another important object of the present invention is the provision of an implement of the character described and combining means for performing cultivating and earth moving operations and being further adapted with means for changing its structural arrangement according to the particular operation being performed.

A further object of this invention is the provision of a device adapted for the performance of both cultivating and earth moving operations, and being provided with locking means for maintaining its composite form and structural rigidity when its interfitting parts are relatively disposed for use as a shovel.

A still further object of this invention is the provision of a cultivating and shoveling device of the character described which is provided with means for changing from one structural arrangement to the other in response to pressure imparted by the toe of the person using the implement.

Additional important objects of my invention will become apparent upon reading the following detailed description of one preferred embodiment thereof when it is read with reference to the accompanying drawings, in which.

Figure 1:
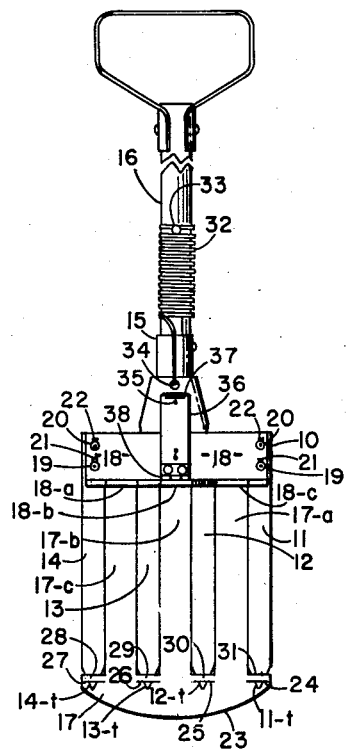
Figure 1 is a diagrammatic plan view of a device constructed according to my invention showing the manner in which the prongs fit into the longitudinal and transverse slots of the planar member.

Reference is again made to Figure 1 in which the numeral 10 designates the yoke portion of the fork assembly in the dual purpose garden implement of my invention. Extending outwardly from the yoke portion 10 is a plurality of flat prongs such as 11, 12, 13, and 14. Oppositely from the prongs, the yoke 10 is conformed to provide a socket 15, better seen in the side view of Figure 2, into which the handle member 16 is fitted.

Upon the face of the fork assembly opposite from the handle socket 15, is positioned a planar member which includes a longitudinally extended section 17 having parallel strap-like portions 17–a, 17–b, and 17–c, and a yoke section 18 to which the strap portions of the planar section 17 are attached by means of hinge segments designated in Figure 1 as 18–a, 18–b and 18–c.

The yoke 18 of the planar member is movably attached to the yoke 10 of the fork assembly by means of a plurality of headed studs such as 19 and 20 fixedly attached to the yoke 10 and disposed within longitudinal slots such as 21 and 22 in the yoke section 18 of the planar member, thus permitting longitudinal movement of the planar sections 17 and 18 within the limits of the slots 21 and 22.

Adjacent the arcuate outer edge 23 of the planar section 17 is a plurality of short, transverse lineal perforations designated in Figure 1 as 24, 25, 26 and 27 which, for descriptive brevity, will be referred to as transverse slits in order to distinguish them from the prong-receiving slots longitudinally disposed laterally of and between the strap portions 17–a, 17–b and 17–c.

Figure 2:
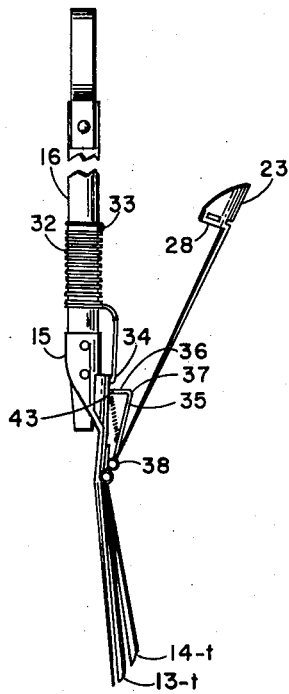
Figure 2 is a diagrammatic side view of the device seen in Figure 1.

Between each of the transverse slits, such as 24, 26, etc. in Figure 1, and the adjacent prong-receiving slot is a narrow band of metal as at 28, 29, 30 and 31, best seen at 28 in Figures 1 and 2, which is displayed upwardly from the general plane of the surface of the planar section 17, as is clearly shown at 28 in the side view of Figure 2, so that the prong tips 11–t, 12–t, 13–t 14–t are enterable thereunder as seen at 14–t in Figure 2.

A coil spring 32 is attached to the handle member 16 at 33 and to the yoke section 18 at the point 34 and is biased tensionally to urge the planar sections 18 and 17 toward the handle member 16 to the limit established by the slots 21 and 22 and the headed studs 19 and 20 disposed therein.

Movement of the planar sections 17 and 18 in the plane of and longitudinally relative to the fork assembly is initiated by applying pressure to an operating arm which consists of a longitudinally extended strap-like portion 35 disposed diagonally outwardly from the yoke section 18, then bent backwardly along the line 37 to provide an inwardly disposed spacing portion 36. The strip portion 35 is attached to the yoke section 18 along the line 38 by means of a spring loaded hinge which is tensionally biased to hold the arm member 35 in the upward position in which it is shown in Figure 3 with the end of its spacing portion 36 firmly disposed against the face of the yoke section 18 as best seen in Figure 2.

In the plan view of Figure 1, the device is shown ready for use as a shovel. It will be observed that the fork tips 11–t, 12–t, 13–t and 14–t are disposed under the transverse strap portions 31, 30, 29 and 28 respectively, and through the transverse slits 24, 25, 26 and 27. Also, it will be noted that the yoke section 18, under the urge of the spring 32, is held upwardly toward the handle 16 as far as permitted by the slots 21 and 22 and the studs 19 and 20.

Figure 3:
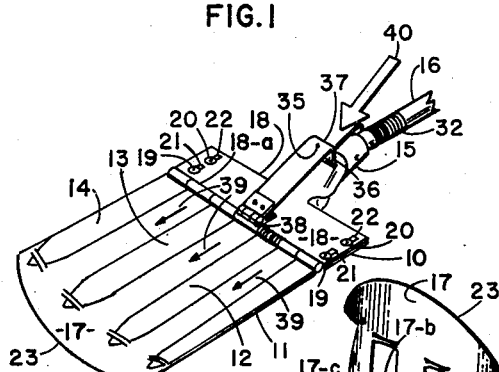
Figure 3 is a perspective view of the operative end of the device of my invention showing the manner in which the planar member is movable longitudinally relative to the fork prongs.
Figure 4:
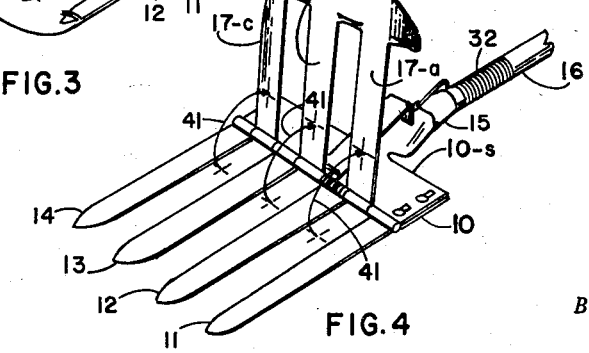
Figure 4 is a perspective view similar to Figure 3 showing the planar member swinging outwardly upon disengagement from the tips of the work prongs.

The method of disengaging the planar section 17 from aligning engagement with the fork assembly is clearly illustrated in Figures 3 and 4 in which the device is shown with its arcuate edge 23 disposed downwardly toward the ground. Pressure applied by the toe of the gardner in the direction of the arrow 40 in Figure 3 against the angled edge 37 of the arm 35, causes the section 17 to move downwardly in the direction of the arrows 39 so that the prong points 11–t, 12–t, 13–t and 14–t become disengaged from the slits 24, 25, etc. in Figure 1, whereupon the normal bias of the spring segments 18–a, 18–b, and 18–c causes the planar section 17 to swing upwardly in the direction of the arrows 41 as indicated in Figure 4, to the position shown in Figure 2. With the planar section 17 in this upward position the use of the fork in the normal manner for cultivating purposes is unimpaired, and spacing is such that the toe of the gardener may be placed on the upper shoulder 10–s of the fork yoke 10 to force the fork prongs into the ground during digging operations in hard ground.

Figure 5:
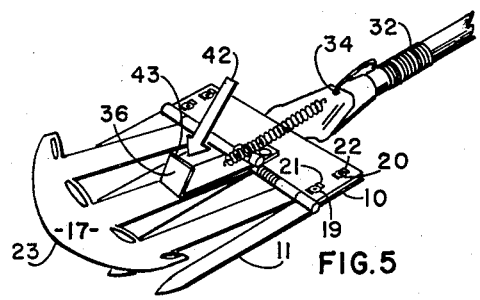
Figure 5 is a perspective view similar to Figures 3 and 4 showing the planar member being pressed downwardly for re-engagement with the tips of the fork prongs.

To re-engage the planar section 17 in uniplanar alignment with the fork prongs 11, 12, etc., the user of the device moves his toe downwardly close to the handle member 16 and against the bent-in spacing portion 36 of the arm 35 thus causing the arm to rotate on its hinge 38 until the toe pressure becomes effective in the direction of arrow 42 in Figure 5 upon the end 43 of the spacing portion 36, forcing the planar section 17 into coplanar juxtaposition with the fork prongs. At this point, slight relaxation of the downward pressure enables the normal bias of the spring 32 to draw the planar sections upwardly and the prong tips into engagement with the transverse slits 24, 25, etc. Pressing the arcuate edge 23 into the ground forces the planar sections 17 and 18 to their upward limit of engagement with the fork assembly, assuring rigid interlocking of the interspaced parts.

It should be clearly noted that the term "planar" (and any variations thereof stemming from the same root) is intended to be interpreted broadly and not to be limited to a flat configuration.

In order to comply with the statute, this invention has been set forth in the form of one specific embodiment in which it has been illustrated and described in more or less detail, but it is to be understood that the details and arrangements are subject to change and modification and that the embodiment itself is amenable to substantial modification and numerous variations, and the invention, therefore, is not to be restricted to the particular structure and details shown and described herein, but is to be limited in scope only to the extent defined by the following claims:

I claim:

1. An earth moving implement comprising: a cultivating fork including a yoke portion having a plurality of prongs extended therefrom in one direction and a handle member extended therefrom in the opposite direction; a movable interspace-filling member cooperable in size and conformation to substantially laterally and contiguously align with said prongs and fill the interspaces between said prongs; hinge means; a slidable member hingedly connected by said hinge means to said interspace-filling member at a location remote from the ends of said prongs; slidable mounting means slidably mounting said slidable member with respect to said yoke portion for limited longitudinal movement with respect to said yoke portion and said prongs; biasing spring means biasing said slidable member toward said handle member; securing means securing said interspace-filling member in substantially laterally contiguous alignment with said prongs and filling the interspaces between said prongs and including a plurality of perforations spaced transversely across said interspace-filling member and adjacent the ends of said prongs and cooperable to receive the ends of said prongs therein upon relative slidable movement of said slidable member with respect to said yoke portion toward said handle member; and means for disengaging and reengaging said interspace-filling member in substantially laterally contiguous alignment with said prongs and filling the interspaces between said prongs and including; lever means attached to and extended outwardly from said slidable member and cooperable when forcibly pressed in a direction away from said handle member to move said interspace-filling member downwardly away from said handle member against the action of said biasing spring means and to disengage the ends of said prongs from said perforations, said hinge means connecting said interspace-filling member and said slidable member having spring means therein biased to swing said interspace-filling member outwardly from its lateral alignment with said prongs, said lever means being hinged to said slidable member and being cooperable to rotate about its hinge line into contact with the surface of the disengaged interspace-filling member and to rotate the latter back into laterally contiguous aligned interspace-filling relationship between said prongs, said biasing spring means biasing the slidable member toward the handle member being effective to move said slidable member toward said handle member causing reengagement of the ends of said prongs with said perforations in said interspace-filling member.

2. An earth moving implement comprising: a cultivating fork including a yoke portion having a plurality of substantially flat prongs extended therefrom in one direction and a handle member extended therefrom in the opposite direction; a movable interspace-filling member having a plurality of laterally spaced longitudinal slots therein cooperable to receive said prongs in substantially laterally and contiguously aligned juxtaposition and to fill the interspaces between said prongs; hinge means; a slidable member hingedly connected by said hinge means to said interspace-filling member at a location remote from the ends of said prongs; slidable mounting means slidably mounting said slidable member with respect to said yoke portion for limited longitudinal movement with respect to said yoke portion and said prongs; biasing spring means biasing said slidable member toward said handle member; securing means securing said interspace-filling member in substantially laterally contiguous alignment with said prongs and filling the interspaces between said prongs and including a plurality of perforations spaced transversely across said interspace-filling member adjacent the ends of said slots spaced from said yoke portion and cooperable to receive the ends of said prongs therein upon relative slidable movement of said slidable member with respect to said yoke portion toward said handle member; and means for disengaging and reengaging said interspace-filling member in substantially laterally contiguous alignment with said prongs and filling the interspaces between said prongs and including; lever means attached to and extended outwardly from said slidable member and cooperable when forcibly pressed in a direction away from said handle member to move said interspace-filling member downwardly away from said handle member against the action of said biasing spring means and to disengage the ends of said prongs from said perforations, said hinge means connecting said interspace-filling member and said slidable member having spring means therein biased to swing said interspace-filling member outwardly from its lateral alignment with said prongs, said lever means being hinged to said slidable member and being cooperable to rotate about its hinge line into contact with the surface of the disengaged interspace-filling member and to rotate the latter back into laterally contiguous aligned interspace-filling relationship between said prongs, said biasing spring means biasing the slidable member toward the handle member being effective to move said slidable member toward said handle member causing reengagement of the ends of said prongs with said perforations in said interspace-filling member.

3. An earth moving implement comprising: a cultivating fork including a yoke portion having a plurality of prongs extended therefrom in one direction and a handle member extended therefrom in the opposite direction; a movable substantially planar interspace-filling member cooperable in size and conformation to substantially laterally and contiguously align with said prongs in substantially the same plane and fill the interspaces between said prongs; hinge means; a substantially planar slidable member hingedly connected by said hinge means to said interspace-filling member at a location remote from the ends of said prongs; slidable mounting means slidably mounting said slidable member with respect to said yoke portion for limiting longitudinal movement with respect to said yoke portion and said prongs; biasing spring means biasing said slidable member toward said handle member; securing means securing said interspace-filling member in substantially laterally contiguous alignment with said prongs in substantially the same plane and filling the interspaces between said prongs and including a plurality of perforations spaced transversely across said interspace-filling member and adjacent the ends of said prongs and cooperable to receive the ends of said prongs therein upon relative slidable movement of said slidable member with respect to said yoke portion toward said handle member; and means for disengaging and reengaging said interspace-filling member in substantially laterally contiguous alignment with said prongs in substantially the same plane and filling the interspaces between said prongs and including; lever means attached to and extended outwardly from said slidable member and cooperable when forcibly pressed in a direction away from said handle member to move said interspace-filling member downwardly away from said handle member against the action of said biasing spring means and to disengage the ends of said prongs from said perforations, said hinge means connecting said interspace-filling member and said slidable member having spring means therein biased to spring said interspace-filling member outwardly from its lateral alignment with said prongs, said lever means being hinged to said slidable member and being cooperable to rotate about its hinge line into contact with the surface of the disengaged interspace-filling member and to rotate the latter back into laterally contiguous aligned interspace-filling relationship between said prongs, said biasing spring means biasing the slidable member toward the handle member being effective to move said slidable member toward said handle member causing reengagement of the ends of said prongs with said perforations in said interspace-filling member.

4. An earth moving implement comprising: a cultivating fork including a yoke portion having a plurality of substantially flat prongs extended therefrom in one direction and a handle member extended therefrom in the opposite direction; a movable substantially planar interspace-filling member having a plurality of laterally spaced longitudinal slots therein cooperable to receive said prongs in the substantially laterally and contiguously aligned juxtaposition in substantially the same plane and to fill the interspaces between said prongs; hinge means; a slidable generally flat yoke member hingedly connected by said hinge means to said interspace-filling member at a location remote from the ends of said prongs; said slidable member having a plurality of slot-like perforations therein; a plurality of headed stud members fixedly attached to said yoke portion and disposed through said slot-like perforations; biasing spring means connecting said handle member and said slidable member, said spring means being biased to move said slidable member toward said handle member within the limits of movement defined by said perforations and said stud members; securing means securing said substantially planar interspace-filling member in substantially laterally contiguous co-planar alignment with said prongs and filling the interspaces between said prongs and including a plurality of lineal perforations disposed transversely of said prongs in said substantially planar interspace-filling member adjacent the ends of said slots spaced from said yoke portion, surface areas of said substantially planar interspace-filling member adjacent said perforations being displaced upwardly from the normal plane of the surface thereof to permit entry of the tips of said prongs therein upon relative slidable movement of said slidable member with respect to said yoke portion toward said handle member; and means for disengaging and reengaging said interspace-filling member in substantially laterally contiguous coplanar alignment with said prongs and filling the interspaces between said prongs and including; a lever member attached to and extending outwardly from said slidable member and cooperable when forcibly pressed downwardly from the direction of said handle member toward the tips of said prongs to move said interspace-filling member downwardly away from said handle and to disengage said tips of said prongs from said lineal perforations, said hinge means connecting said interspace-filling member and said slidable member having spring means therein biased to swing said interspace-filling member outwardly from its lateral coplanar alignment with said prongs, said lever member being hinged to said slidable member adjacent the hinge line of said hinge means connecting said interspace-filling member and said slidable member, said lever member being cooperable to rotate about its hinge line into contact with the surface of the disengaged interspace-filling member and to rotate the latter downwardly into coplanar juxtaposition with said prongs, said biasing spring means connecting said handle member and said slidable member being effective to move said slidable member toward said handle member causing reengagement of the tips of said prongs in said lineal perforations in said interspace-filling member.

References Cited in the file of this patent
UNITED STATES PATENTS
157,219    Perkins _____ Nov. 24, 1874